United States Patent
Tai et al.

(10) Patent No.: US 12,426,036 B2
(45) Date of Patent: *Sep. 23, 2025

(54) MAPPING ENTITIES TO ACCOUNTS FOR DE-ANONYMIZATION OF ONLINE ACTIVITY

(71) Applicant: 6SENSE INSIGHTS, INC., San Francisco, CA (US)

(72) Inventors: Chihi Tai, Mountain View, CA (US); Daniel Lo, San Francisco, CA (US); Tai Vo, Orange, CA (US); Yulia Tyutina, Eden Prairie, MN (US); Kenneth Golonka, San Francisco, CA (US); Viral Bajaria, Redwood City, CA (US)

(73) Assignee: 6SENSE INSIGHTS, INC., San Francisco, CA (US)

( * ) Notice: Subject to any disclaimer, the term of this patent is extended or adjusted under 35 U.S.C. 154(b) by 425 days.

This patent is subject to a terminal disclaimer.

(21) Appl. No.: 18/073,807

(22) Filed: Dec. 2, 2022

(65) Prior Publication Data

US 2023/0180214 A1 Jun. 8, 2023

Related U.S. Application Data

(60) Provisional application No. 63/285,630, filed on Dec. 3, 2021.

(51) Int. Cl.
*H04W 72/1263* (2023.01)
*H04B 17/318* (2015.01)
*H04B 17/391* (2015.01)

(52) U.S. Cl.
CPC ...... *H04W 72/1263* (2013.01); *H04B 17/318* (2015.01); *H04B 17/391* (2015.01)

(58) Field of Classification Search
CPC ............ H04W 72/1263; H04B 17/318; H04B 17/391; H04B 17/3912
See application file for complete search history.

(56) References Cited

U.S. PATENT DOCUMENTS

2001/0022558 A1 9/2001 Karr, Jr. et al.
2009/0287623 A1 11/2009 Martin et al.
(Continued)

OTHER PUBLICATIONS

ISA/US International Search Report in PCT/US2022/51656, mailed Mar. 1, 2023.

*Primary Examiner* — Chae S Lee
(74) *Attorney, Agent, or Firm* — Procopio, Cory, Hargreaves & Savitch LLP (57) ABSTRACT

The Internet generally provides anonymity to the online activities of visitors to web sites and other online resources. This prevents the operators of web sites and others from identifying visitors who do not wish to be identified. Accordingly, embodiments generate mappings between entities (e.g., IP addresses, domains, cookies, or devices) and accounts (e.g., companies) to de-anonymize online activities. In an embodiment, summary mappings are generated based on activity data. Each summary mapping may comprise an entity, potential account identifier, and an activity vector that measures observations of an association between the entity and potential account identifier from an activity source for multiple summary periods. A model may be applied to the summary mappings to compute signal strengths for a plurality of candidate mappings. A winning mapping may then be selected for each entity in the candidate mappings, and used to associate the entity with an account in one or more downstream functions.

20 Claims, 5 Drawing Sheets

(56) References Cited

U.S. PATENT DOCUMENTS

| | | |
|---|---|---|
| 2010/0050248 A1 | 2/2010 | Porras et al. |
| 2010/0061656 A1 | 3/2010 | Wiemker |
| 2013/0281115 A1* | 10/2013 | Dupray ................ G01S 5/0244 455/456.1 |
| 2016/0239868 A1* | 8/2016 | Demsey ............. G06Q 30/0264 |
| 2016/0359897 A1 | 12/2016 | Yadav et al. |
| 2018/0351978 A1* | 12/2018 | Preizler ................ H04L 41/142 |
| 2020/0304519 A1* | 9/2020 | Gil ........................ G06F 16/951 |

* cited by examiner

MAPPING ENTITIES TO ACCOUNTS FOR DE-ANONYMIZATION OF ONLINE ACTIVITY

CROSS-REFERENCE TO RELATED APPLICATIONS

This application claims priority to U.S. Provisional Patent App. No. 63/285,630, filed on Dec. 3, 2021, which is hereby incorporated herein by reference as if set forth in full.

BACKGROUND

Field of the Invention

The embodiments described herein are generally directed to mapping anonymous Internet entities (e.g., Internet Protocol (IP) addresses, domains, cookies, and/or devices) to known accounts (e.g., company names), to thereby de-anonymize an online visitor.

Description of the Related Art

One significant and well-known problem that arises in the context of Internet communications is the ability for Internet users to remain virtually anonymous. In particular, unless a visitor to a website chooses to accurately identify himself or herself, an operator of the web site may know virtually nothing about the identity of that visitor.

In most cases, all the operator of the website will know about the visitor is an IP address used by the visitor's browsing device, a domain of the visitor (e.g., a domain with which the IP address is associated), and/or, if available, one or more "cookies" (data stored on the user's device by a website during a visit to that website) or a device identifier. This is generally not enough information to initiate meaningful contact with the visitor, for example, to market a product or service to the visitor.

Accordingly, a solution is needed for piercing the unique shroud of anonymity afforded to visitors by the Internet. Preferably, such a solution would enable marketers or merchants to determine the accounts associated with otherwise anonymous Internet visitors. Such a solution could be especially advantageous for predictive marketing methods, such as those described in U.S. Pat. No. 9,202,227, issued on Dec. 1, 2015, and generally enable more effective marketing.

SUMMARY

Accordingly, systems, methods, and non-transitory computer-readable media are disclosed for mapping anonymous Internet entities to known accounts.

In an embodiment, a method for de-anonymizing anonymous online activity comprises using at least one hardware processor to, in each of one or more iterations: generate a plurality of summary mappings from data representing online activities, wherein each of the plurality of summary mappings comprises an entity, a potential account identifier, and an activity vector comprising, for each of a plurality of summary periods, a measure of observations of an association between the entity and the potential account identifier from one activity source in the online activities; apply a generalized linear model to the plurality of summary mappings to compute a signal strength for each of a plurality of candidate mappings, wherein each of the plurality of candidate mappings maps a single entity represented in the plurality of summary mappings to a single account identifier represented in the plurality of summary mappings; for each entity represented in the plurality of candidate mappings, select a winning mapping between that entity and an account identifier, from among one or more candidate mappings for that entity in the plurality of candidate mappings, based on the signal strengths computed for the candidate mappings for that entity; and store at least a subset of the winning mappings in final mappings that are accessible to one or more downstream functions.

The measure of observations may comprise a summary score. The summary score for each of the plurality of summary periods in the activity vector of each of the plurality of summary mappings may be calculated as:

summary score =

$w_1 \times$ number of activity sources $+ w_2 \times$ number of intervals with activity wherein $w_1$ and $w_2$ are weights, wherein the number of activity sources is a number of different activity sources which observed the association between the entity and the potential account identifier in the summary mapping, and wherein the number of intervals with activity is a number of time intervals within the summary period during which the association between the entity and the potential account identifier in the summary mapping were observed by the one activity source.

The method may further comprise, prior to the one or more iterations, training the generalized linear model by: applying a probabilistic model to a plurality of prior summary mappings to estimate a probability for each of the plurality of prior summary mappings; generating a training dataset by labeling each of the plurality of prior summary mappings with the probability estimated for that prior summary mapping; and training the generalized linear model using the training dataset in supervised learning. The probabilistic model may utilize one or more model parameters representing, for each activity source, a credibility of the activity source and a time decay for the activity source.

The generalized linear model may comprise a time decay function. The generalized linear model may be a Bayesian statistical model. The generalized linear model may be expressed as:

$$S = \text{sigmoid}\left(\alpha + \sum_{i=1}^{n} \beta_i \cdot decay_{exp}(V_i, \lambda_i)\right)$$

wherein S is the signal strength for a candidate mapping, sigmoid( ) is a sigmoid function, $\alpha$ is an expected mean value when there are no supporting activity sources, n is a number of activity sources by which the candidate mapping was observed, i represents an index into the number n of activity sources, $\beta_i$ is a weight for activity source i, $decay_{exp}( )$ is a time decay function, $V_i$ is the activity vector from activity source i, and $\lambda_i$ is a decay factor for activity source i.

The time decay function may be expressed as:

$$decay_{exp}(V_i, \lambda_i) = 1 - e^{-V_i \lambda_i}$$

wherein e is Euler's number.

Each entity may be either an Internet Protocol (IP) address, domain, cookie, or device identifier.

Each potential account identifier may comprise a company name.

The method may further comprise using the at least one hardware processor to: acquire activity data from a plurality of data sources, wherein the activity data comprise a plurality of events, and wherein each of the plurality of events represents an online activity; and generate the data representing online activities by associating each of the plurality of events with an account identifier from a master firmographic database.

The method may further comprise using the at least one hardware processor to, in each of the one or more iterations, when the winning mapping for an entity would change an existing mapping for the entity in the final mappings, exclude that winning mapping from the at least a subset of the winning mappings stored in the final mappings unless that winning mapping has retained a highest signal strength among all candidate mappings for that entity for at least a predefined length of time.

The method may further comprise using the at least one hardware processor to, in each of the one or more iterations, apply one or more filters to the winning mappings to exclude one or more of the winning mappings from the at least a subset of the winning mappings stored in the final mappings. The one or more filters may comprise excluding any winning mappings for an entity that is an IP address which is associated with more than a threshold amount of traffic. The one or more filters may comprise excluding any winning mappings for an entity for which a measure of competition within the plurality of candidate mappings satisfies a threshold. The measure of competition may be computed as:

$$\frac{\max(\text{signal strengths})}{\text{sum}(\text{signal strengths})} > w_3 \times (1 - \max(\text{signal strengths}))$$

wherein signal strengths are the signal strengths of all of the candidate mappings for the entity for which the measure of competition is computed, and wherein $w_3$ is a weight.

The method may further comprise using the at least one hardware processor to provide access to the final mappings via queries based on one or both of entity or account identifier.

It should be understood that any of the features in the methods above may be implemented individually or with any subset of the other features in any combination. Thus, to the extent that the appended claims would suggest particular dependencies between features, disclosed embodiments are not limited to these particular dependencies. Rather, any of the features described herein may be combined with any other feature described herein, or implemented without any one or more other features described herein, in any combination of features whatsoever. In addition, any of the methods, described above and elsewhere herein, may be embodied, individually or in any combination, in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for mapping anonymous Internet entities to known accounts. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. Example Infrastructure

Figure 1:
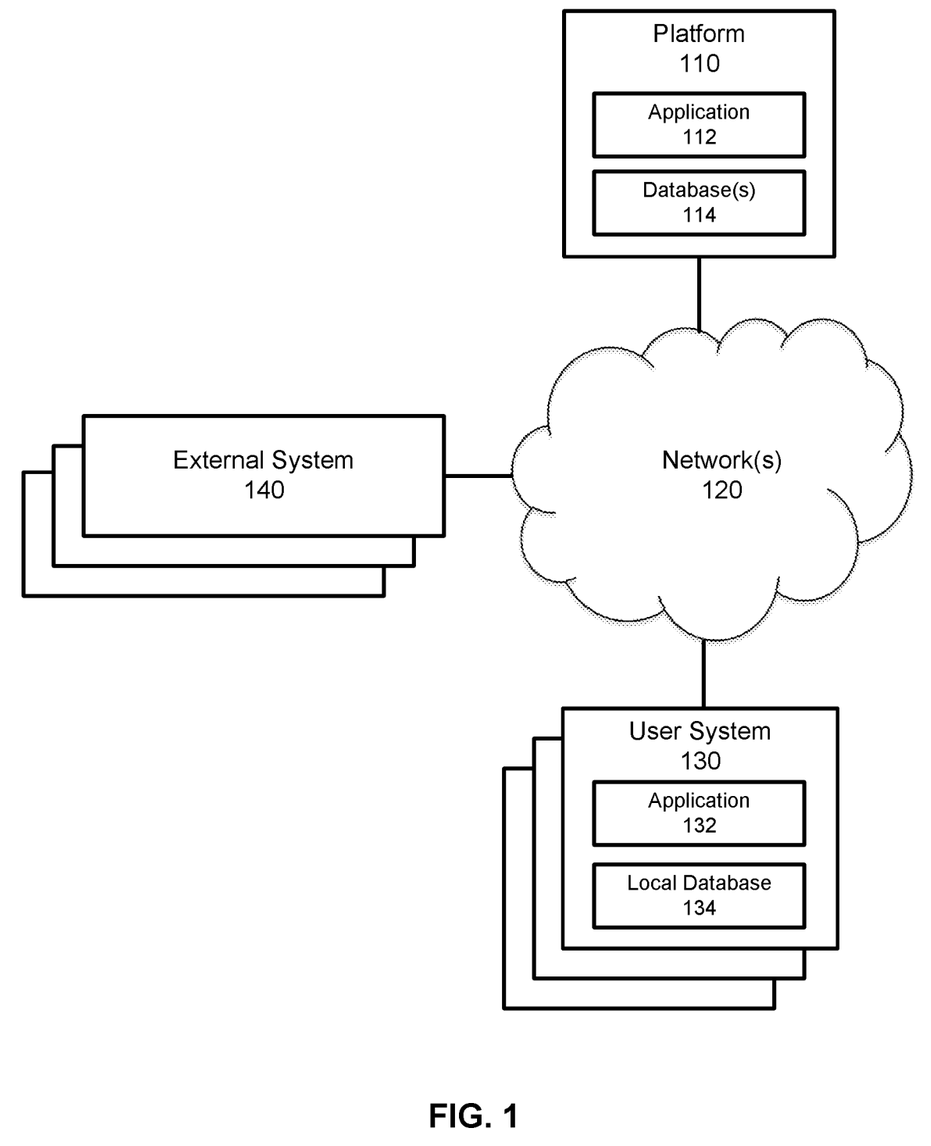
FIG. 1 illustrates an example infrastructure, in which one or more of the processes described herein, may be implemented, according to an embodiment.

FIG. 1 illustrates an example infrastructure in which one or more of the disclosed processes may be implemented, according to an embodiment. The infrastructure may comprise a platform 110 (e.g., one or more servers) which hosts and/or executes one or more of the various functions, processes, methods, and/or software modules described herein. Platform 110 may comprise dedicated servers, or may instead be implemented in a computing cloud, in which the resources of one or more servers are dynamically and elastically allocated to multiple tenants based on demand. In either case, the servers may be collocated and/or geographically distributed. Platform 110 may also comprise or be communicatively connected to a server application 112 and/or one or more databases 114. In addition, platform 110 may be communicatively connected to one or more user systems 130 via one or more networks 120. Platform 110 may also be communicatively connected to one or more external systems 140 (e.g., other platforms, websites, etc.) via one or more networks 120.

Network(s) 120 may comprise the Internet, and platform 110 may communicate with user system(s) 130 through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to various systems through a single set of network(s) 120, it should be understood that platform 110 may be connected to the various systems via different sets of one or more networks. For example, platform 110 may be connected to a subset of user systems 130 and/or external systems 140 via the Internet, but may be connected to one or more other user systems 130 and/or external systems 140 via an intranet. Furthermore, while only a few user systems 130 and external systems 140, one server application 112, and one set of database(s) 114 are illustrated, it should be understood that the infrastructure may comprise any number of user systems, external systems, server applications, and databases.

User system(s) 130 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, and/or the like. However, it is generally contemplated that a user system 130 would be a personal computer or workstation of a user representing an organization (e.g., business, non-profit organization, government agency, etc.) that has a need or desire to map anonymous Internet entities to accounts, or representing an operator that generates and manages mappings of Internet entities to accounts as an internal or externally facing service. Each user system 130 may comprise or be communicatively connected to a client application 132 and/or one or more local databases 134.

External system(s) 140 may comprise any system from which platform 110 may receive data and/or to which platform 110 may send data, over network(s) 120. An external system 140 may send data to platform 110 via an application programming interface (API) of platform 110, or platform 110 may retrieve data from external system 140 via an API of external system 140. Similarly, platform 110 may send data to an external system 140 via an API of external system 140, or external system 140 may retrieve data from platform 110 via an API of platform 110. It is generally contemplated that external system(s) 140 would comprise one or more data sources, and typically, a plurality of different data sources. Each data source may provide activity data (e.g., representing Internet or other online activities) to platform 110. Examples of data sources include, without limitation, a website, an email server, a marketing automation platform (MAP), a customer relationship management (CRM) platform, a cookie-tracking source, a third-party vendor, and/or the like.

Platform 110 may comprise web servers which host one or more websites and/or web services. In embodiments in which a website is provided, the website may comprise a graphical user interface, including, for example, one or more screens (e.g., webpages) generated in HyperText Markup Language (HTML) or other language. Platform 110 transmits or serves one or more screens of the graphical user interface in response to requests from user system(s) 130. In some embodiments, these screens may be served in the form of a wizard, in which case two or more screens may be served in a sequential manner, and one or more of the sequential screens may depend on an interaction of the user or user system 130 with one or more preceding screens. The requests to platform 110 and the responses from platform 110, including the screens of the graphical user interface, may both be communicated through network(s) 120, which may include the Internet, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 114) that are locally and/or remotely accessible to platform 110. It should be understood that platform 110 may also respond to other requests from user system(s) 130.

Platform 110 may comprise, be communicatively coupled with, or otherwise have access to one or more database(s) 114. For example, platform 110 may comprise one or more database servers which manage one or more databases 114.

Server application 112 executing on platform 110 and/or client application 132 executing on user system 130 may submit data (e.g., user data, form data, etc.) to be stored in database(s) 114, and/or request access to data stored in database(s) 114. Any suitable database may be utilized, including without limitation My SQL™, Oracle™ IBM™, Microsoft SQL™, Access™, PostgreSQL™, MongoDB™, and the like, including cloud-based databases and proprietary databases. Data may be sent to platform 110, for instance, using the well-known POST request supported by HTTP, via FTP, and/or the like. This data, as well as other requests, may be handled, for example, by server-side web technology, such as a servlet or other software module (e.g., comprised in server application 112), executed by platform 110.

In embodiments in which a web service is provided, platform 110 may receive requests from user system(s) 130 and/or external system(s) 140, and provide responses in eXtensible Markup Language (XML), JavaScript Object Notation (JSON), and/or any other suitable or desired format. In such embodiments, platform 110 may provide an application programming interface (API) which defines the manner in which user system(s) 130 and/or external system(s) 140 may interact with the web service. Thus, user system(s) 130 and/or external system(s) 140 (which may themselves be servers), can define their own user interfaces, and rely on the web service to implement or otherwise provide the backend processes, methods, functionality, storage, and/or the like, described herein. For example, in such an embodiment, a client application 132, executing on one or more user system(s) 130, may interact with a server application 112 executing on platform 110 to execute one or more or a portion of one or more of the various functions, processes, methods, and/or software modules described herein.

Client application 132 may be "thin," in which case processing is primarily carried out server-side by server application 112 on platform 110. A basic example of a thin client application 132 is a browser application, which simply requests, receives, and renders webpages at user system(s) 130, while server application 112 on platform 110 is responsible for generating the webpages and managing database functions. Alternatively, the client application may be "thick," in which case processing is primarily carried out client-side by user system(s) 130. It should be understood that client application 132 may perform an amount of processing, relative to server application 112 on platform 110, at any point along this spectrum between "thin" and "thick," depending on the design goals of the particular implementation. In any case, the software described herein, which may wholly reside on either platform 110 (e.g., in which case server application 112 performs all processing) or user system(s) 130 (e.g., in which case client application 132 performs all processing) or be distributed between platform 110 and user system(s) 130 (e.g., in which case server application 112 and client application 132 both perform processing), can comprise one or more executable software modules comprising instructions that implement one or more of the processes, methods, or functions described herein.

2. Example Processing Device

Figure 2:
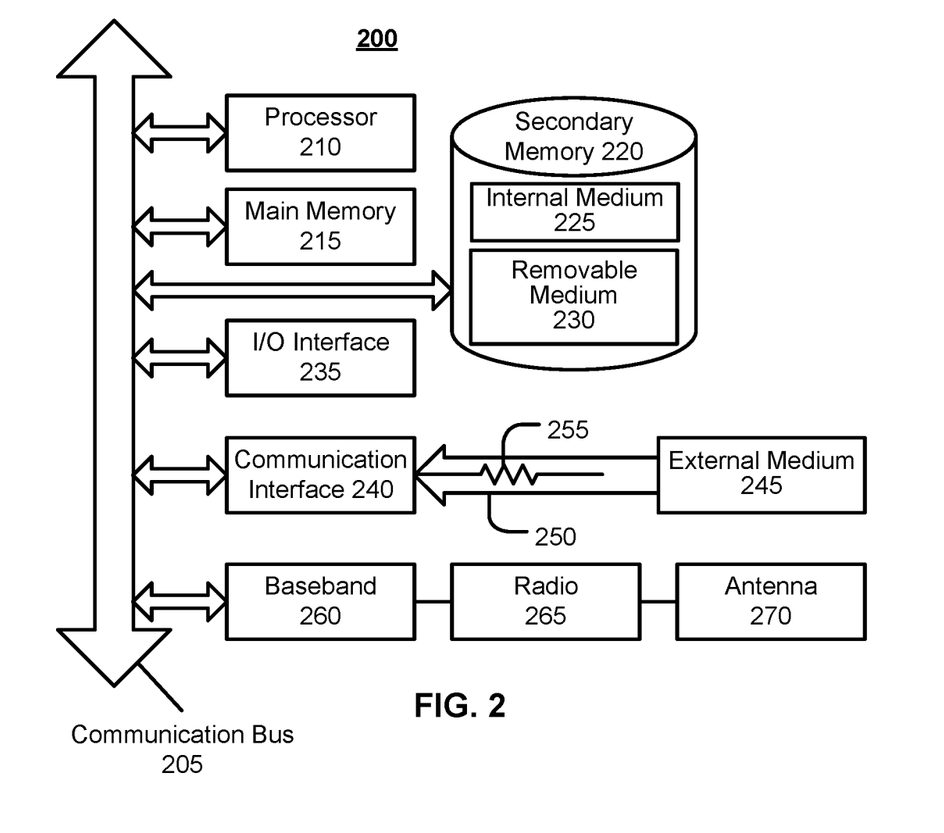
FIG. 2 illustrates an example processing system, by which one or more of the processes described herein, may be executed, according to an embodiment.

FIG. 2 is a block diagram illustrating an example wired or wireless system 200 that may be used in connection with various embodiments described herein. For example, system 200 may be used as or in conjunction with one or more of the functions, processes, or methods (e.g., to store and/or execute the software) described herein, and may represent components of platform 110, user system(s) 130, external system(s) 140, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors 210. Processor(s) 210 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, any of the processors (e.g., Pentium™, Core i7™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPM), IEEE 696/S-100, and/or the like.

System 200 preferably includes a main memory 215 and may also include a secondary memory 220. Main memory 215 provides storage of instructions and data for programs executing on processor 210, such as any of the software discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 is a non-transitory computer-readable medium having computer-executable code (e.g., any of the software disclosed herein) and/or other data stored thereon. The computer software or data stored on secondary memory 220 is read into main memory 215 for execution by processor 210. Secondary memory 220 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

In alternative embodiments, secondary memory 220 may include other similar means for allowing computer programs or other data or instructions to be loaded into system 200. Such means may include, for example, a communication interface 240, which allows software and data to be transferred from external storage medium 245 to system 200. Examples of external storage medium 245 include an external hard disk drive, an external optical drive, an external magneto-optical drive, and/or the like.

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server (e.g., platform 110) via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 120) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 120), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed software) is stored in main memory 215 and/or secondary memory 220. Computer-executable code can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225 and/or removable medium 230), external storage medium 245, and any peripheral device communicatively coupled with communication interface 240 (including a network information server or other network device). These non-transitory computer-readable media are means for providing software and/or other data to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

In an embodiment, I/O interface 235 provides an interface between one or more components of system 200 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 200 may also include optional wireless communication components that facilitate wireless communication over a voice network and/or a data network (e.g., in the case of user system 130). The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also encodes the digital signals for transmission and generates a baseband transmit audio signal that is routed to the modulator portion of radio system 265. The modulator mixes the baseband transmit audio signal with an RF carrier signal, generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor(s) 210.

Processor(s) 210 may have access to data storage areas 215 and 220. Processor(s) 210 are preferably configured to execute instructions (i.e., computer programs, such as the disclosed software) that can be stored in main memory 215 or secondary memory 220. Computer programs can also be received from baseband processor 260 and stored in main memory 210 or in secondary memory 220, or executed upon receipt. Such computer programs, when executed, can enable system 200 to perform the various functions of the disclosed embodiments.

3. Example Data

The term "visitor" will be used throughout the present disclosure to refer to the individual or organization for which de-anonymization is being performed. However, it should be understood that the term "visitor" may also encompass other participants in online activity who may not "visit" a web site in a strict sense of the word. For example, a contact who sends an email message, without actually visiting a website, would also be contemplated by the term "visitor," as used herein. In general, a visitor may be any individual or organization whose identity, with respect to some activity, is initially unknown as a result of the general anonymity of the Internet.

The term "entity" may be used herein to refer to data that are associated with a visitor throughout an online Internet activity. For example, an entity may include, without limitation, an IP address used by a visitor's device (e.g., a user system 130) for online communications, a domain name (e.g., for a website and/or email domain) associated with a visitor during online communications, a cookie that has been stored on a visitor's device during browsing, and/or a device identifier (e.g., Media Access Control (MAC) address) of a visitor's device. Such data may be permanently, semi-permanently, or temporarily associated with the visitor, and typically will not uniquely identify the visitor. For example, an IP address may be a static IP address that is always associated with a particular visitor's device, or a dynamic IP address that may be temporarily assigned by an Internet service provider to one device and then subsequently reassigned by the Internet service provider (ISP) to a different device. In addition, a particular visitor may utilize multiple IP addresses (e.g., one IP address while the visitor is at work and another IP address while the visitor is at home). Similarly, one domain name may be associated with multiple visitors, and one visitor may be associated with multiple domain names. As another example, a visitor may be associated with multiple cookies at once and over time, and each cookie may exist for only a limited time on a visitor's device before being deleted (e.g., manually by a user of the device, automatically after an expiration period or upon termination of a session, etc.).

The term "event" may be used herein to refer to a specific instance of any activity, acquired from any data source. Activities may include, without limitation, accessing a webpage of a web site, filling out an online form, purchasing a product via an ecommerce site, contacting a merchant or salesperson (e.g., via an online form, electronic mail (email) message, instant-messaging chat, Short Message Service (SMS) text, Multimedia Messaging Service (MMS) message, etc.), and/or any other online interaction. Activities could also include offline activities, such as attending a trade show or seminar, calling a customer-service call center, making an offline purchase, and/or the like. As an example, a visitor to a web site may fill out an online form within a webpage of the web site, and this activity may be communicated to server application 112, along with an entity representing the visitor (e.g., the IP address used by the visitor's device to communicate with the website, a domain name associated with the visitor's ISP or enterprise, a string representing the partial or entire contents of a tracking cookie stored on the visitor's device, etc.), as an event.

An event may be implemented as a data structure (e.g., vector, linked list, array, delimited string, etc.) which comprises a representation of the entity (e.g., IP address, domain, cookie, and/or device) that represents the visitor and a timestamp representing the time at which the activity occurred. It should be understood that this data structure could also comprise any additional data, which may aid in mapping the visitor to an account, identifying or categorizing the activity, and/or the like. For example, each event data structure could also comprise a representation of the activity, source information indicating the data source of the event and/or activity, and/or the like. In addition, the event may comprise visitor-specific information, if, for example, the visitor submitted a form or logged into his or her account during a visit. In such a case, the source can incorporate user-specific information, entered in the form or acquired from a user profile associated with the logged-in account, in the event information recorded for the event.

The term "mapping" may be used herein to refer to each association between an entity and an account (e.g., company name or other account identifier). Each mapping indicates that there is at least some reason to believe that the entity has been used by the associated account in the past, and therefore, that current or future activity by that entity may represent online activity by that account. A mapping may be implemented as a data structure which comprises a representation of the entity (e.g., IP address, domain, cookie, and/or device) and an account identifier (e.g., company name). It should be understood that this data structure could also comprise any additional data.

In an embodiment, each mapping data structure comprises or is associated with a confidence value which has been computed based on one or more factors, as described elsewhere herein. In this context, the confidence value for a particular mapping represents a measure of confidence or probability that a visitor, who has used, is using, or will use the respective entity, is associated with the respective account. The confidence value will primarily be described herein as a decimal value between zero and one. However, it should be understood that the range of possible confidence values can be easily converted to any desired range of values, with corresponding modifications to any disclosed calculations which rely upon the confidence value.

4. Training Process

Figure 3:
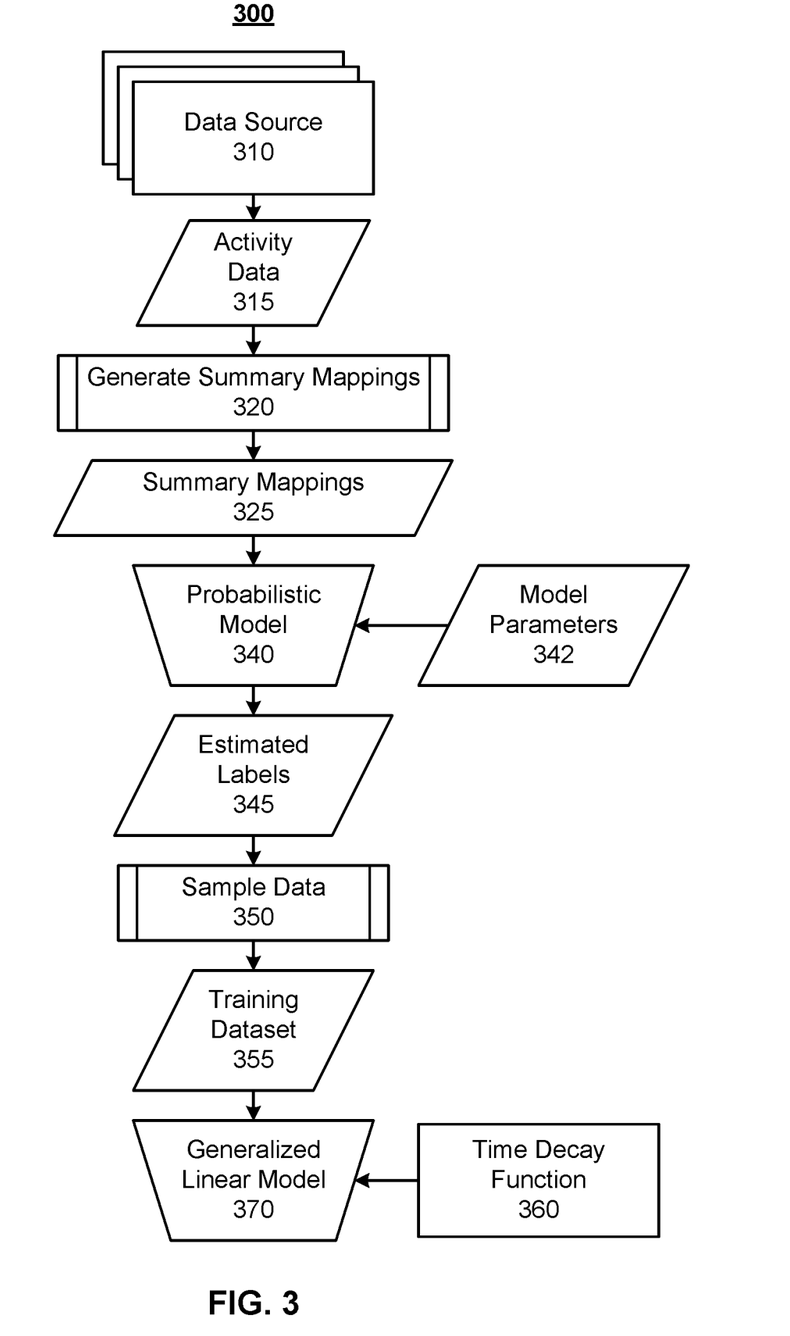
FIG. 3 illustrates a data flow for training a machine-learning model to be used in mapping entities to accounts, according to an embodiment.

FIG. 3 illustrates a data flow 300 for training a machine-learning model to be used in mapping entities to accounts, according to an embodiment. Initially, one or a plurality of data sources 310 provide activity data 315 to server application 112 of platform 110. Data source(s) 310 may be external system(s) 140 and/or could be hosted on platform 110 with server application 112. Data source(s) 310 may comprise website(s), marketing automation platform(s), CRM system(s), cookie-tracking source(s), third-party vendor(s), proprietary data, and/or the like. Each data source 310 may be associated with a different level of credibility than other data sources 310.

Activity data 315 may comprise events. Each event may be represented in an event data structure, as described elsewhere herein. Each event data structure may comprise or indicate, for example, an activity source, a timestamp (e.g., indicating the date and/or time on which the activity, underlying the event, occurred), the entity (e.g., IP address, website and/or email domain, cookie, and/or device identifier), the data source 310 from which the event was received and/or at which the event occurred, a hash of an email address associated with the event (if any), a company name (if any), a geographical location (based on a visitor entry during the underlying activity or a user profile if the visitor was logged in to a user account for the activity), and/or the geographical IP location if the entity includes an IP address. Each IP address can be associated with a country, since different IP blocks are allocated to different countries. Thus, the geographical IP location can be derived by a lookup on the IP address (e.g., against a table in database(s) 114, via a query to an external system 140, etc.). Each event data structure could also comprise additional information (e.g., relevant information from a visitor entry or user profile), such as city, state, Zip code, Global Positioning System (GPS) coordinates (e.g., latitude, longitude, and/or elevation), and/or the like. One or more fields of each event data structure may be normalized to a standard spelling, format, and/or the like.

In a process 320, summary mappings 325 are generated from activity data 315. Summary mappings 325 may comprise mappings between entities and company names occurring in activity data 315 for each activity source. A company name represents a potential account to be mapped to an entity, and may be identified from an event in activity data 315 for the entity, for example, from a form submitted by the visitor with the entity (e.g., a company name field), the domain used by a visitor with the entity (e.g., in an email address used by the visitor, the source domain of the visitor, etc.), a user profile if the visitor logged into a website, and/or the like. Examples of activity sources include, without limitation, websites, online forms (i.e., form-fill), email, browser cookies, logins, vendors, manual inputs, and the like. Each mapping may comprise or identify the entity, the potential account, and the activity source, and comprise an activity vector comprising, for each of a plurality of summary periods, a measure of observations of an association between the entity and the potential account from the activity source. The measure of observations for a given summary period may be a summary score for the entire summary period. For example, if the summary period is one week, the activity vector may comprise a summary score for the mapping from the activity source in each of a plurality of weeks. At this point, summary mappings 325 could comprise multiple potential accounts mapped to a single entity.

In an embodiment, the summary score for a given mapping of an entity to a potential account from an activity source for a particular summary period may be calculated as:

$$\text{summary score} = w_1 \times \text{number of activity sources} + w_2 \times \text{number of intervals with activity} \quad \text{Equation (1)}$$

wherein $w_1$ and $w_2$ are weights, which may be based on historical data or experience, wherein the number of activity sources is a number of different activity sources which observed the association between the entity and the potential account identified in the mapping, and wherein the number of intervals with activity is a number of time intervals within the summary period during which the association between the entity and the potential account identified in the mapping were observed by the activity source identified in the mapping. In an embodiment in which the summary period is a week, the time interval may be a day. It should be understood that the summary score should be computed for each of the plurality of summary periods that is represented in the activity vector in a mapping in summary mappings 325. Each summary score represents how strongly an entity is associated with a potential account for a particular summary period.

As an example, assume that the summary period is a week, the time interval is a day, and that two different activity sources imply a mapping of the IP address 1.1.1.1 to a potential account identified as ABC.com. Assume that the first activity source has provided two observations of form-fills that map IP address 1.1.1.1 to ABC.com on the same day during week 1, and the second activity source has provided two observations of email messages that map IP address 1.1.1.1 to ABC.com on two separate days during week 1. If $w_1=0.2$ and $w_2=0.8$, the summary scores for these two activity sources for week 1 are calculated as:

$$\text{summary score}_{formfill,week1}=0.2\times2+0.8\times1=1.2$$

$$\text{summary score}_{email,week1}=0.2\times2+0.8\times2=2.0$$

It should be understood that these are just examples, and that the summary score may be calculated according to a different equation and/or using different weights.

In an embodiment, before a sufficient number of mappings have been collected and validated with ground-truth labels, a probabilistic model 340 may be used to derive a simulated label for each mapping in summary mappings 325. Each simulated label represents an estimate of whether the associated mapping is valid (i.e., true) or invalid (i.e., false). The simulated label may be represented as a probability, such as a real value from zero to one, and/or as an indication of validity or invalidity. For example, a probability equal to or greater than a threshold may indicate validity, whereas a probability less than the threshold may indicate invalidity. Probabilistic model 340 may utilize the activity source and timings of the observations in each mapping in summary mappings 325, along with model parameters 342, to estimate the probability and/or other label for the mapping.

Model parameters 342 may comprise or reflect a source credibility for each activity source and a time decay for each activity source. The source credibility for each activity source may represent how likely the activity source is to present when there is a valid or invalid mapping. The time decay for each activity source may represent how much the source credibility of that activity source decays over time. Model parameters 342 may be derived using historical data and/or by a user with expertise or experience in source credibility and time decay.

In an embodiment, model parameters 342 are represented as a vector associated with each activity source. The vector represents the probability that a mapping from the associated activity source is valid for a plurality of different time periods. In other words, the vector represents both the source credibility and time decay for the associated activity source. As an example, model parameters 342 could comprise the following vectors for a form-fill activity source and a cookie activity source:

Form-Fill: [0.5, 0.25, 0.125]
Cookie: [0.1, 0.05, 0.01]

wherein the three values in each vector represent a probability that a mapping from the activity source is valid 0-6 months from the observation, 6-12 months from the observation, and 12-24 months from the observation, respectively. After 24 months, the probability for each activity source may drop to zero, or activity data 315 and/or summary mappings 325 may be generated to not contain any data older than 24 months. Thus, in the above example, a mapping observed from a form-fill activity source has a 50% probability of being a valid mapping within 6 months from the observation, a 25% probability of being a valid mapping 6-12 months from the observation, and a 12.5% probability of being a valid mapping 12-24 months from the observation. Similarly, a mapping observed from a cookie activity source has a 10% probability of being a valid mapping within 6 months from the observation, a 5% probability of being a valid mapping 6-12 months from the observation, and a 1% probability of being a valid mapping 12-24 months from the observation. These two vectors reflect that the form-fill activity source is more credible than the cookie data activity source, but decays at a similar rate.

Probabilistic model 340 may apply model parameters 342 to summary mappings 325 to produce estimated labels 345 for summary mappings 325, based on the distribution of the activity sources in activity data 315. For example, for each mapping in summary mappings 325, the vector, associated with the activity source for that mapping and representing the source credibility and time decay for that activity source, may be used to determine an estimated label, represented as a probability and/or indication of validity or invalidity, for that mapping. Each mapping in summary mappings 325 may be associated with the label that is output by probabilistic model 340 for that mapping.

In subprocess 350, the summary mappings 325 with associated estimated labels 345 may be sampled to produce training dataset 355. The data may be sampled based on estimated labels 345. For example, the data may be sampled with stratification on the estimated labels 345 to produce a training dataset 355 with balanced labels.

As discussed above, probabilistic model 340 may be used to label summary mappings 325 with a probability or indication of validity or invalidity, so that they can be used in a training dataset for a generalized linear model 370. It should be understood that, if a training dataset with a sufficient number of validated labeled summary mappings already exists, it may be used as training dataset 355. In this case, probabilistic model 340 may be unnecessary, such that subprocesses 320 and 350 can be omitted. Probabilistic model 340 essentially uses the distribution of true source evidence to generalize the parameters for generalized linear model 370. In any case, training dataset 355 may comprise mappings, which may each identify an entity, a potential account, and an activity source, and comprise an activity vector representing the summary score for a measure of observations of an association between the entity and the potential account by the activity source for each of a plurality of summary periods, labeled with the corresponding estimated label 345 output by probabilistic model 340.

Training dataset 355 may be used in supervised learning to train generalized linear model 370. Generalized linear model 370 may determine a signal strength for a mapping based on a linear function, applied to the activity vector in the mapping, which utilizes the identity of the activity source of the mapping and a time decay function 360. The signal strength indicates the probability that a mapping is valid or invalid. In an embodiment, generalized linear model 370 is a Bayesian statistical model, which provides flexibility in model formulation and posterior distributions. For example, the Bayesian statistical model may be implemented using the Python™ package PyMC, which focuses on advanced Markov chain Monte Carlo and variational fitting algorithms. However, it should be understood that generalized linear model 370 may utilize any suitable machine-learning model and implementation.

In an embodiment, generalized linear model 370 may be expressed mathematically as:

$$S = \text{sigmoid}\left(\alpha + \sum_{i=1}^{n} \beta_i \cdot decay_{exp}(V_i, \lambda_i)\right) \quad \text{Equation (2)}$$

wherein S is the signal strength for the mapping, sigmoid( ) is the sigmoid function, α is the expected mean value when there are no supporting activity sources, n is the number of activity sources by which the mapping was observed, i represents an index into the n activity sources, $\beta_i$ is the weight for activity source i, $decay_{exp}$( ) is time decay function 360, $V_i$ is the activity vector from activity source i supporting the mapping, and $\lambda_i$ is a decay factor for activity source i. Signal strength S may be a real value between 0 and 1. Notably, in this embodiment, each of the parameters of generalized linear model 370 is easy to explain and adjust, which ensures high transparency into how generalized linear model 370 arrives at signal strength S for a given mapping. In addition, generalized linear model 370 is computationally inexpensive and scalable, such that it can be feasibly applied to thousands, millions, billions, or more of mappings using a general-purpose computing system.

Figure 4:
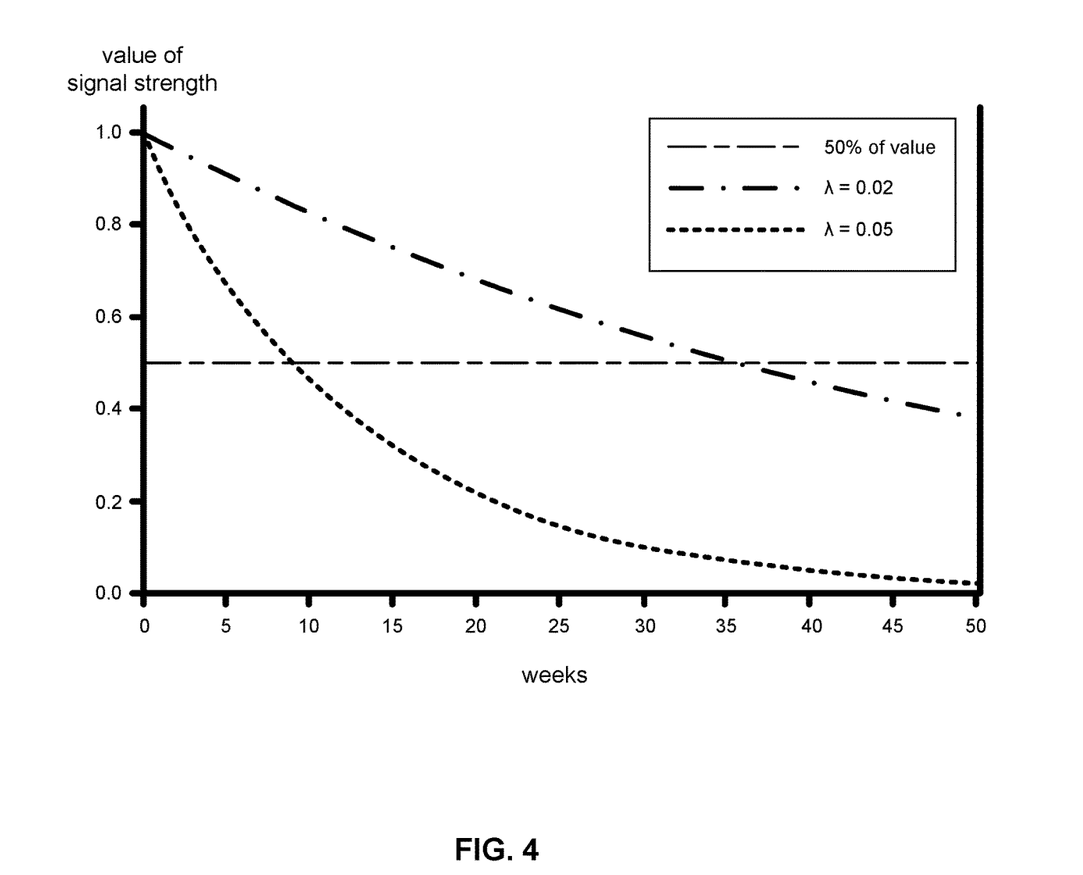
FIG. 4 illustrates the decay of a value over time, according to an embodiment.

In an embodiment, time decay function 360 may be the exponential cumulative density function:

$$decay_{exp}(V_i, \lambda_i) = 1 - e^{-V_i \lambda_i}$$

wherein e is Euler's number. Time decay function 360 is designed to discount the signal strength S for a mapping as time passes. FIG. 4 illustrates the decay of a signal strength S over a plurality of weeks, using $decay_{exp}$( ) with two different decay factors λ and a starting value of 1.0, according to an embodiment. As illustrated, the greater the decay factor λ, the faster the decay of signal strength S.

5. Mapping Process

Figure 5:
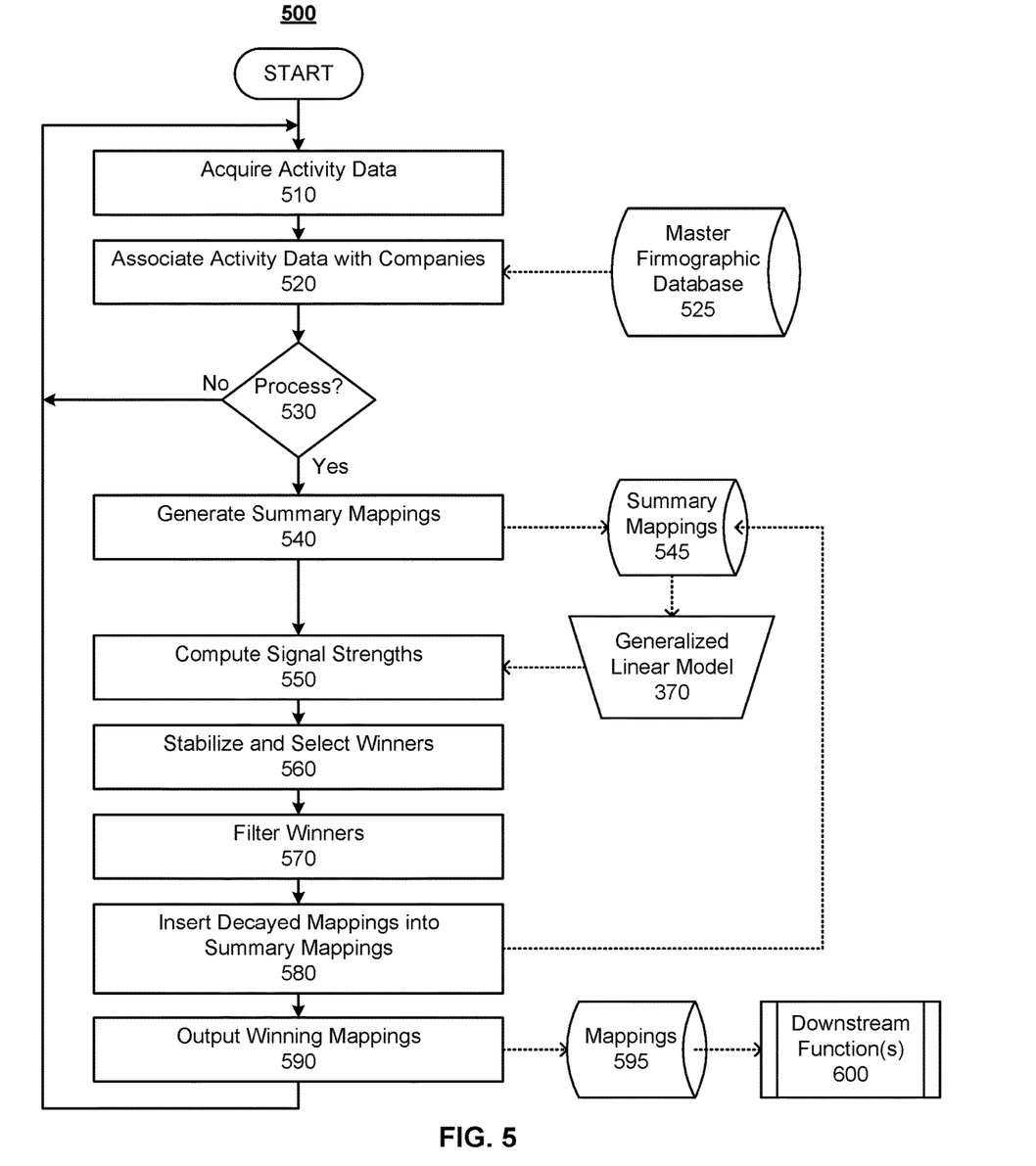
FIG. 5 illustrates a process for generating a mapping of entities to accounts, according to an embodiment.

FIG. 5 illustrates a process 500 for generating a mapping of entities to accounts, according to an embodiment. At a high level, process 500 represents a data pipeline that maps entities in aggregated activity data to accounts, representing companies, using an algorithm that votes on which account is most associated with each entity. While process 500 is illustrated with a certain arrangement and ordering of subprocesses, process 500 may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

Process 500 may be embodied in one or more software modules that are executed by one or more hardware processors (e.g., processor 210), for example, as a software application (e.g., server application 112, client application 132, and/or a distributed application comprising both server application 112 and client application 132), which may be executed wholly by processor(s) of platform 110, wholly by processor(s) of user system(s) 130, or may be distributed across platform 110 and user system(s) 130, such that some portions or modules of the software application are executed by platform 110 and other portions or modules of the software application are executed by user system(s) 130. Process 500 may be implemented as instructions represented in source code, object code, and/or machine code. These instructions may be executed directly by hardware processor(s) 210, or alternatively, may be executed by a virtual machine operating between the object code and hardware processor(s) 210. In addition, the disclosed software may be built upon or interfaced with one or more existing systems.

Alternatively, process 500 may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

In subprocess 510, activity data is acquired. The activity data may be acquired from one or more, and generally a plurality, of data sources 310, and represent one or more, and generally, a plurality of activity sources. For example, the activity data may comprise email activity from an email application, web activity from a website, browser cookies from a cookie-tracking source, form-filled data from a website, vendor data from a third-party vendor, login data from a website, manually input data, feedback from corrected mappings, and/or the like. Subprocess 510 may comprise "pulling" the activity data from one or more external systems 140, representing data sources 310, through an API of each external system 140. Alternatively, subprocess 510 may comprise receiving the activity data as they are "pushed" from one or more external systems 140, representing data sources 310, through an API of server application 112. As another alternative, subprocess 510 may comprise retrieving activity data, that were previously received and stored, from database(s) 114. In any case, activity data may comprise the same set of data as activity data 315, for example, using the same event data structure as described with respect to activity data 315.

Subprocess 510 may also comprise cleaning, normalizing, and/or filtering the activity data. For instance, the activity data for entities may be inserted into a common table (e.g., in database(s) 114). Then, names, domains, locations, and/or other fields may be cleaned and normalized to a standard set of spellings, formats, and/or the like. As an example, instances of "US", "U.S.", "USA", or "U.S.A." could all be converted to a normalized representation of "United States". In addition, activity data comprising IP addresses that have been identified as associated with bots, hosting providers, Internet service providers, mobile networks, and/or the like (e.g., any IP address present in one or more blacklists) may be filtered out.

In subprocess 520, the activity data, acquired in subprocess 510, may be associated with potential accounts where possible. In particular, each event in the activity data may be associated with an account identifier in a master firmographic database 525, which may be stored in database(s) 114. At this point, the account identifier represents a potential account to which the entity in the event data structure may be mapped. An embodiment of master firmographic database 525 is disclosed in U.S. patent application Ser. No. 17/362,843, filed on Jun. 29, 2021, which is hereby incorporated herein by reference as if set forth in full. Each account identifier may uniquely identify a tuple of company name, domain, and company location in master firmographic database 525. Each tuple represents a company that can be targeted as a prospective customer, and each account identifier may be, directly or indirectly, associated with other information (e.g., contact information, other firmographic information, etc.) in master firmographic database 525 or another database. Any activity data that can be associated with a potential account can be packaged into a single dataset for further processing in process 500. Conversely, any activity data that cannot be associated with a company can be excluded from further processing in process 500. The output of subprocess 520 may comprise events from the activity data associated with potential accounts. This data may be stored for subsequent retrieval and further processing.

In subprocess 530, it is determined whether or not to process the data, produced by subprocess 520. When it is determined to process the data (i.e., "Yes" in subprocess 530), the data is processed in an iteration of subprocesses 540-590. Otherwise, when it is not determined to process the data (i.e., "No" in subprocess 530), process 500 continues to acquire activity data in subprocess 510 and associate the activity data with potential accounts in subprocess 520. In an embodiment, the data may be processed periodically in each of a plurality of iterations. In this case, process 530 determines to process the data after each expiration of a time interval. The time interval may be any suitable length, such as an hour, a day, a week, a month, or the like. Alternatively or additionally, subprocess 530 may determine to process the data in response to a user operation (e.g., input via a graphical user interface provided by server application 112) and/or other triggering event (e.g., the acquisition of new activity data in subprocess 510).

In subprocess 540, summary mappings 545 are generated from the data, output by subprocess 520, which may comprise a plurality of events that are each associated with a potential account. Subprocess 540 may be identical or similar to subprocess 320, and produce summary mappings 545 comprising the same or similar fields as summary mappings 325. For example, each candidate mapping in summary mappings 545 may identify the entity, the potential account, and the activity source by which the candidate mapping was observed, and comprise an activity vector comprising, for each of a plurality of summary periods, a measure of observations of the association between the entity and the potential account from the activity source. It should be understood that the term "candidate" in this context refers to a mapping, between an entity and an account, that is being considered as one possibility for the final, true, and valid mapping for that entity. The measure of observations for each summary period may comprise or consist of a summary score, computed in the same manner as in subprocess 320, for example, using Equation (1). It should be understood that the candidate mappings in summary mappings 545 may either be valid or invalid.

In subprocess 550, the signal strength for each candidate mapping in summary mappings 545 may be computed. In an embodiment, to aid in the computation, summary mappings 545 may be converted into a hash table of all the measures of observations (e.g., summary scores) for each summary period and activity source for each unique association of an entity with a potential account across all candidate mappings in summary mappings 545. This enables weightings that are specific to each activity source and summary period to be easily applied to the mappings. In particular, the signal strength S for each mapping from each activity source may be computed using generalized linear model 370, for example, using Equation (2) on each unique association of an entity with a potential account represented in the hash table. In this case, $\beta_i$ is the weight for activity source i, $V_i$ is the activity vector for activity source i, and $\lambda_i$ is a decay factor for activity source i. In this embodiment, the signal strength S for a given mapping represents the probability that the given mapping is valid (e.g., as a real value between zero and one), based on all the measures of observations (e.g., summary scores) for all of the activity sources from which that mapping was observed, subjected to time decay function 360.

As an example of the computation of signal strength S, assume that the IP address 2.2.2.2 has two candidate mappings to either account XYZ or account CDE in summary mappings 545. Further assume that the candidate mapping of IP address 2.2.2.2 to XYZ has two activity sources, cookie and email, providing the following activity vectors:

$V_{cookie,XYZ}=[0,0,3,0]$
$V_{email,XYZ}=[0,1,1,0]$

In this example, it should be understood that each activity vectors comprises summary scores for four summary periods (e.g., four weeks). The activity vector $V_{cookie,XYZ}$ indicates that the summary scores for summary periods one, two, and four are all 0, whereas the summary score for summary period three is 3. Similarly, the activity vector $V_{email,XYZ}$ indicates that the summary scores for summary periods one and four are both 0, whereas the summary scores for summary periods two and three are both 1. Further assume that the candidate mapping of IP address 2.2.2.2 to CDE has only one activity source, cookie, providing the following activity vector:

$V_{cookie,CDE}=[0,0,1,0]$

Further assume that $\alpha=-0.5$, $\beta_{cookie}=0.1$, $\beta_{email}=0.3$, $\lambda_{cookie}=0.3$, and $\lambda_{email}=0.1$. The decay factor of $\lambda_{cookie}=0.3$ produces a decay vector of [1.0, 0.7, 0.5, 0.4] for the cookie activity source for the four summary periods, and the decay factor of $\lambda_{email}$=0.1 produces a decay vector of [1.0, 0.9, 0.8, 0.7] for the email activity source for the four summary periods.

Using Equation (2), the signal strength of the candidate mapping of IP address 2.2.2.2 to XYZ may be calculated as:

$$S_{XYZ} = \text{sigmoid } (-0.5 +$$
$$0.1 \cdot [0, 0, 3, 0] \cdot [1.0, 0.7, 0.5, 0.4] + 0.3 \cdot [0, 1, 1, 0] \cdot [1.0, 0.9, 0.8, 0.7]) =$$
$$\text{sigmoid } (-0.5 + 0.1 \cdot 1.5 + 0.3 \cdot 1.7) = \text{sigmoid } (0.16) = 0.54$$

Similarly, using Equation (2), the signal strength of the candidate mapping of IP address 2.2.2.2 to CDE may be calculated as:

$$S_{CDE} = \text{sigmoid } (-0.5 + 0.1 \cdot [0, 0, 1, 0] \cdot [1.0, 0.7, 0.5, 0.4]) =$$
$$\text{sigmoid } (-0.5 + 0.1 \cdot 0.5) = \text{sigmoid } (-0.45) = 0.39$$

Because $S_{XYZ}$=0.54>$S_{CDE}$=0.39, the probability of XYZ being the valid mapping for IP address 2.2.2.2 is greater than the probability of CDE being the valid mapping for IP address 2.2.2.2.

In subprocess 560, the winners may be stabilized and selected based on the signal strengths, computed in subprocess 550. An unstable mapping is one that switches the account to which a particular entity is mapped too frequently. Unstable mappings can cause problems for downstream functions that rely on the mappings. Thus, stabilization limits the frequency by which a new winning mapping for a given entity can be selected. In an embodiment, stabilization requires that, for an entity with an existing mapping, another mapping with a higher signal strength than all other mappings for the entity, including the existing mapping, cannot be chosen as a winning mapping, unless and until it retains the highest signal strength for a predefined length of time (e.g., one week, eight days, a certain number of summary periods, etc.). Subject to this stabilization requirement, a winning mapping between an entity and account may be selected for each entity as the candidate mapping for that entity with the highest signal strength, as computed in subprocess 550. In an alternative embodiment, stabilization may be omitted. In the event of a tie in the signal strengths computed for two or more candidate mappings, any suitable tie-breaking mechanism may be utilized. For example, the candidate mapping with the most recent activity and/or that is supported by the most number of activity sources, from among all candidate mappings with the highest signal strength, may be selected as the winning mapping.

In subprocess 570, the winning mappings may be filtered, according to one or more filters, to reduce or eliminate noise in the mappings. In an embodiment, a first filter excludes IP addresses with an excessive amount of traffic, and/or a second filter excludes entities with too many competing candidate mappings. It should be understood that these are simply two examples, and that fewer, more, or different filter(s) may be applied to the winning mappings. Alternatively, subprocess 570 could be omitted, such that no filters are applied to the winning mappings.

The objective of the first filter is to identify and exclude IP addresses associated with an excessive amount of traffic, such as an excessive number of events, visitors, or devices, in the activity data. For example, IP addresses that are associated with more than a threshold amount of traffic (e.g., events, visitors, devices, etc.) in the activity data may be excluded from the winning mappings. These IP addresses may represent mobile networks, proxies, data centers, or other IP addresses that are shared across different users from different organizations.

The second filter is based on the understanding that, if there are too many competing candidate mappings for a particular entity, there is no confidence that a single account should be associated with that entity. Thus, in an embodiment, the second filter compares the ratio of the highest signal strength of a candidate mapping for a given entity to the sum of signal strengths of all candidate mappings for the given entity against a threshold. For example, this comparison may be expressed as:

$$\frac{\max(\text{signal strengths})}{\text{sum}(\text{signal strengths})} > w_3 \times (1 - \max(\text{signal strengths}))$$

wherein signal strengths are the signal strengths of all candidate mappings for the entity, and wherein $w_3$ is a weight (e.g., $w_3$=0.5). Using this particular comparison, winning mappings with relatively low signal strengths need a greater percentage of the total signal strength in order to avoid exclusion by the second filter, whereas winning mappings with relatively high signal strengths can avoid exclusion by the second filter despite a larger number of competing candidate mappings. It should be understood that this is just one example, and that the second filter may be implemented using other comparisons or algorithms that compute a measure of competition and exclude a winning mapping for an entity for which there is a relatively high measure of competition (e.g., determined when the measure of competition satisfies a threshold).

In an embodiment, subprocess 570 may join the mappings to other data (e.g., third-party vendor data) that adds useful information that can be used by the filter(s). As one example, the useful information may comprise an IP type. The IP type can be used to inform heuristics and set thresholds in the first filter for identifying the IP addresses with the highest traffic. Such IP addresses are unlikely to represent a company IP address, and therefore, can be excluded from the winning mappings determined in subprocess 560.

Subprocess 560 or 570 may also comprise location cleaning. As discussed elsewhere herein, the geographical IP location of an IP address can be determined (e.g., using a lookup). This IP location can then be used to correct or filter out incorrect candidate mappings (e.g., in subprocess 560) or winning mappings (e.g., in subprocess 570). In many cases, mappings are created from the activity data, acquired in subprocess 510, by joining online activity from an IP address (e.g., which submitted a form) or other entity to a contact (e.g., based on a login to a website) at an account in subprocess 520. However, if the contact does not work at the account (e.g., because the contact left the company but retained the same login), the mapping is also incorrect. In addition, if the company has different locations (e.g., a multi-national company with different branches), each of the locations may be associated with different accounts. In this case, if the contact's activities are related to a different location than the location at which the contact is employed (i.e., the account with which contact is associated), the mapping will be incorrect. Thus, the IP location may be compared to the location of the contact, and the amount of activity by the same IP address that is associated with a different location than the contact's location may be determined. Based on this information, one or more of the following actions may be taken: (1) switching the mapped account for the IP address to the account associated with the company location that corresponds to the IP location; (2) breaking up the mapping into a plurality of mappings for the various accounts representing the different company locations; (3) excluding the mapping if most of the activity is from a location outside the contact's location; or (4) excluding the mapping if the IP location is different from the contact's location and the confidence (e.g., signal strength) of the mapping is low.

In subprocess 580, some mappings, which won but have decayed, which lost in subprocess 560, and/or which were filtered out in subprocess 570, may be inserted into summary mappings 545 to be maintained in subsequent iterations of subprocesses 550-590. There are at least two scenarios in which it may be beneficial to maintain decayed mappings (e.g., has not been reinforced for a certain amount of time), losing mappings (e.g., less signal strength than a competing mapping), or otherwise excluded mapping (e.g., caught by a filter). Mappings that fall into these scenarios may be inserted into summary mappings 545 for the next iteration. In addition, mappings that fall into these scenarios may be retained in the winning mappings.

In the first scenario, a previously winning mapping from a data source 310, other than a data vendor, may lose out to a new mapping from a data vendor due to decay of the non-vendor mapping over time. In this scenario, the non-vendor mapping may be given preference over the vendor mapping, because non-vendor data sources 310 are generally better at uncovering the account that is using an IP address, whereas vendor data sources 310 tend to provide the company that owns the IP address but which is not necessarily using the IP address. Thus, the non-vendor mapping may be retained in summary mappings 545 and/or the winning mappings.

In the second scenario, a mapping that has not been reinforced by another activity source for an amount of time will eventually be filtered out, due to time decay function 360. However, in the event that there is no competing mapping for the same entity, the decayed mapping, which would otherwise be filtered out, may be retained in summary mappings 545 and/or the winning mappings. This is because it is generally preferable to have an old mapping than no mapping at all.

In subprocess 590, at least a subset of the winning mappings are output or stored in or as a final set of mappings 595. In particular, mappings 595 may be updated to comprise all winning mappings from process 500 that were not otherwise excluded. Mappings 595 could also comprise other mappings that have been learned over time (e.g., manually input, acquired from reliable data sources 310, etc.). Each mapping 595 may comprise or identify a particular entity and an account identifier. The account identifier in each mapping 595 may uniquely identify a company by company name, domain, and location (e.g., in master firmographic database 525). Winning mappings which do not have a valid domain or have insufficient corroborating activity sources and/or data sources 310 may be excluded or otherwise distinguished.

In addition, each mapping in mappings 595 may be associated with a confidence level that is based on various factors including, without limitation, the signal strength computed for the mapping, the number of independent activity sources and/or data sources 310 supporting the mapping, the number of competing candidate mappings for the same entity, and/or the relative signal strength of the mapping to the signal strengths of the competing candidate mappings. The factors may be combined in any suitable manner to produce a real value within a continuous range, for example, between zero and one. For example, the factors may be combined using a linear combination of the factors, a machine-learning algorithm, or the like. Additionally or alternatively, the confidence level may be quantized into one of four confidence classes: very high confidence; high confidence; moderate confidence; and low confidence. For example, thresholds may be used to classify the real-valued confidence values according to where they fall within the continuous range. In particular, confidence values on the lowest end of the continuous range may be classified as low confidence, confidence values in a low-to-mid portion of the continuous range may be classified as moderate confidence, confidence values in a mid-to-high portion of the continuous range may be classified as high confidence, and confidence values on the highest end of the continuous range may be classified as very high confidence. The confidence classes may be used for user-facing reporting or other services which are intended to convey the confidence to a human user, whereas the real-valued confidence values may be used for services in which human understanding of the confidence values is not required, such as targeted advertising in a marketing automation platform.

Mappings 595 may be used for one or more downstream functions 600. Mappings 595 may be maintained in a relational database in database(s) 114, which can be queried by server application 112 and/or client applications 132. Alternatively or additionally, server application 112 may provide an API that enables retrieval of individual mappings or subsets of mappings from, or querying of, mappings 595. Alternatively or additionally, server application 112 could push mappings 595 or a subset of mappings 595 to an external system 140 via an API of that external system 140.

As an example, downstream function(s) 600 may comprise an entity-to-account lookup service that enables a known account to be retrieved for a given entity and/or enables known entities to be retrieved for a given account. For example, a downstream function 600 may perform a query on mappings 595 to retrieve an account associated with a given entity (e.g., IP address, domain, cookie, or device) and/or to retrieve all entities associated with a given account. This enables online activities, which may otherwise be anonymous, to be associated with a known company (e.g., represented by an account). In particular, the account identifier for a known company (e.g., obtained by a lookup on mappings 595) may be used to, directly or indirectly, retrieve an abundance of information about the company (e.g., from master firmographic database 515), including company information, contact information, and/or the like.

Such de-anonymization can be useful for a variety of tasks, including marketing, sales, and customer service. Such mappings may be provided as input to one or more of these tasks. For example, downstream functions 600 may comprise one or more of the processes described in U.S. Pat. No. 9,202,227, issued on Dec. 1, 2015, U.S. patent application Ser. No. 12/362,605, filed on Jun. 29, 2021, and/or U.S. patent application Ser. No. 17/736,366, filed on May 4, 2022, which are all hereby incorporated herein by reference as if set forth in full.

It should be understood that the de-anonymization, described herein, may not yield the identity of the actual visitor involved in the online activity associated with a given entity. Rather, the de-anonymization will yield an account, representing a company. Once the company is known, additional information may be acquired, such as contact information for a relevant employee of the company (e.g., someone involved in procurement, who may or may not have been the visitor) and/or other firmographic information about the company.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

As used herein, the terms "comprising," "comprise," and "comprises" are open-ended. For instance, "A comprises B" means that A may include either: (i) only B; or (ii) B in combination with one or a plurality, and potentially any number, of other components. In contrast, the terms "consisting of" "consist of," and "consists of" are closed-ended. For instance, "A consists of B" means that A only includes B with no other component in the same context.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method for de-anonymizing anonymous online activity, the method comprising using at least one hardware processor to, in each of one or more iterations:
generate a plurality of summary mappings from data representing online activities, wherein each of the plurality of summary mappings comprises an entity, a potential account identifier, and an activity vector comprising, for each of a plurality of summary periods, a measure of observations of an association between the entity and the potential account identifier from one activity source in the online activities;
apply a generalized linear model to the plurality of summary mappings to compute a signal strength for each of a plurality of candidate mappings, wherein each of the plurality of candidate mappings maps a single entity represented in the plurality of summary mappings to a single account identifier represented in the plurality of summary mappings, and wherein the signal strength for each of the plurality of candidate mappings indicates a probability that the candidate mapping is valid or invalid;
for each entity represented in the plurality of candidate mappings, select a winning mapping between that entity and the single account identifier, mapped to that entity within one or more candidate mappings for that entity in the plurality of candidate mappings, based on the signal strengths computed for the candidate mappings for that entity; and
store at least a subset of the winning mappings in final mappings that are accessible to one or more downstream functions.

2. The method of claim 1, wherein the measure of observations comprises a summary score.

3. The method of claim 2, wherein the summary score for each of the plurality of summary periods in the activity vector of each of the plurality of summary mappings is calculated as:

$$\text{summary score} = w_1 \times \text{number of activity sources} + w_2 \times \text{number of intervals with activity}$$

wherein $w_1$ and $w_2$ are weights,
wherein the number of activity sources is a number of different activity sources which observed the association between the entity and the potential account identifier in the summary mapping, and
wherein the number of intervals with activity is a number of time intervals within the summary period during which the association between the entity and the potential account identifier in the summary mapping were observed by the one activity source.

4. The method of claim 1, further comprising, prior to the one or more iterations, training the generalized linear model by:
applying a probabilistic model to a plurality of prior summary mappings to estimate a probability for each of the plurality of prior summary mappings;
generating a training dataset by labeling each of the plurality of prior summary mappings with the probability estimated for that prior summary mapping; and
training the generalized linear model using the training dataset in supervised learning.

5. The method of claim 4, wherein the probabilistic model utilizes one or more model parameters representing, for each activity source, a credibility of the activity source and a time decay for the activity source.

6. The method of claim 1, wherein the generalized linear model comprises a time decay function.

7. The method of claim 1, wherein the generalized linear model is a Bayesian statistical model.

8. The method of claim 1, wherein the generalized linear model is expressed as:

$$S = \text{sigmoid}\left(\alpha + \sum_{i=1}^{n} \beta_i \cdot \text{decay}_{exp}(V_i, \lambda_i)\right)$$

wherein S is the signal strength for a candidate mapping, sigmoid( ) is a sigmoid function, $\alpha$ is an expected mean value when there are no supporting activity sources, n is a number of activity sources by which the candidate mapping was observed, i represents an index into the number n of activity sources, $\beta_i$ is a weight for activity source i, $\text{decay}_{exp}$( ) is a time decay function, $V_i$ is the activity vector from activity source i, and $\lambda_i$ is a decay factor for activity source i.

9. The method of claim 8, wherein $$\text{decay}_{exp}(V_i, \lambda_i) = 1 - e^{-V_i \lambda_i}$$

wherein e is Euler's number.

10. The method of claim 1, wherein each entity is either an Internet Protocol (IP) address, domain, cookie, or device identifier.

11. The method of claim 1, wherein each potential account identifier comprises a company name.

12. The method of claim 1, further comprising using the at least one hardware processor to:
   acquire activity data from a plurality of data sources, wherein the activity data comprise a plurality of events, and wherein each of the plurality of events represents an online activity; and
   generate the data representing online activities by associating each of the plurality of events with an account identifier from a master firmographic database.

13. The method of claim 1, further comprising using the at least one hardware processor to, in each of the one or more iterations, when the winning mapping for an entity would change an existing mapping for the entity in the final mappings, exclude that winning mapping from the at least a subset of the winning mappings stored in the final mappings unless that winning mapping has retained a highest signal strength among all candidate mappings for that entity for at least a predefined length of time.

14. The method of claim 1, further comprising using the at least one hardware processor to, in each of the one or more iterations, apply one or more filters to the winning mappings to exclude one or more of the winning mappings from the at least a subset of the winning mappings stored in the final mappings.

15. The method of claim 14, wherein the one or more filters comprise excluding any winning mappings for an entity that is an IP address which is associated with more than a threshold amount of traffic.

16. The method of claim 14, wherein the one or more filters comprise excluding any winning mappings for an entity for which a measure of competition within the plurality of candidate mappings satisfies a threshold.

17. The method of claim 16, wherein the measure of competition is computed as:

$$\frac{\text{max(signal strengths)}}{\text{sum(signal strengths)}} > w_3 \times (1 - \text{max(signal strengths)})$$

wherein signal strengths are the signal strengths of all of the candidate mappings for the entity for which the measure of competition is computed, and wherein $w_3$ is a weight.

18. The method of claim 1, further comprising using the at least one hardware processor to provide access to the final mappings via queries based on one or both of entity or account identifier.

19. A system comprising:
   at least one hardware processor; and
   software that is configured to, when executed by the at least one hardware processor,
   generate a plurality of summary mappings from data representing online activities, wherein each of the plurality of summary mappings comprises an entity, a potential account identifier, and an activity vector comprising, for each of a plurality of summary periods, a measure of observations of an association between the entity and the potential account identifier from one activity source in the online activities,
   apply a generalized linear model to the plurality of summary mappings to compute a signal strength for each of a plurality of candidate mappings, wherein each of the plurality of candidate mappings maps a single entity represented in the plurality of summary mappings to a single account identifier represented in the plurality of summary mappings, and wherein the signal strength for each of the plurality of candidate mappings indicates a probability that the candidate mapping is valid or invalid,
   for each entity represented in the plurality of candidate mappings, select a winning mapping between that entity and the single account identifier, mapped to that entity within one or more candidate mappings for that entity in the plurality of candidate mappings, based on the signal strengths computed for the candidate mappings for that entity, and
   store at least a subset of the winning mappings in final mappings that are accessible to one or more downstream functions.

20. A non-transitory computer-readable medium having instructions stored therein, wherein the instructions, when executed by a processor, cause the processor to:
   generate a plurality of summary mappings from data representing online activities, wherein each of the plurality of summary mappings comprises an entity, a potential account identifier, and an activity vector comprising, for each of a plurality of summary periods, a measure of observations of an association between the entity and the potential account identifier from one activity source in the online activities;
   apply a generalized linear model to the plurality of summary mappings to compute a signal strength for each of a plurality of candidate mappings, wherein each of the plurality of candidate mappings maps a single entity represented in the plurality of summary mappings to a single account identifier represented in the plurality of summary mappings, and wherein the signal strength for each of the plurality of candidate mappings indicates a probability that the candidate mapping is valid or invalid;
   for each entity represented in the plurality of candidate mappings, select a winning mapping between that entity and the single account identifier, mapped to that entity within one or more candidate mappings for that entity in the plurality of candidate mappings, based on the signal strengths computed for the candidate mappings for that entity; and
   store at least a subset of the winning mappings in final mappings that are accessible to one or more downstream functions.

* * * * *